June 2, 1931.  C. H. NORTON  1,807,700
SELF ADJUSTING BEARING FOR SPINDLES
Original Filed Sept. 1, 1925
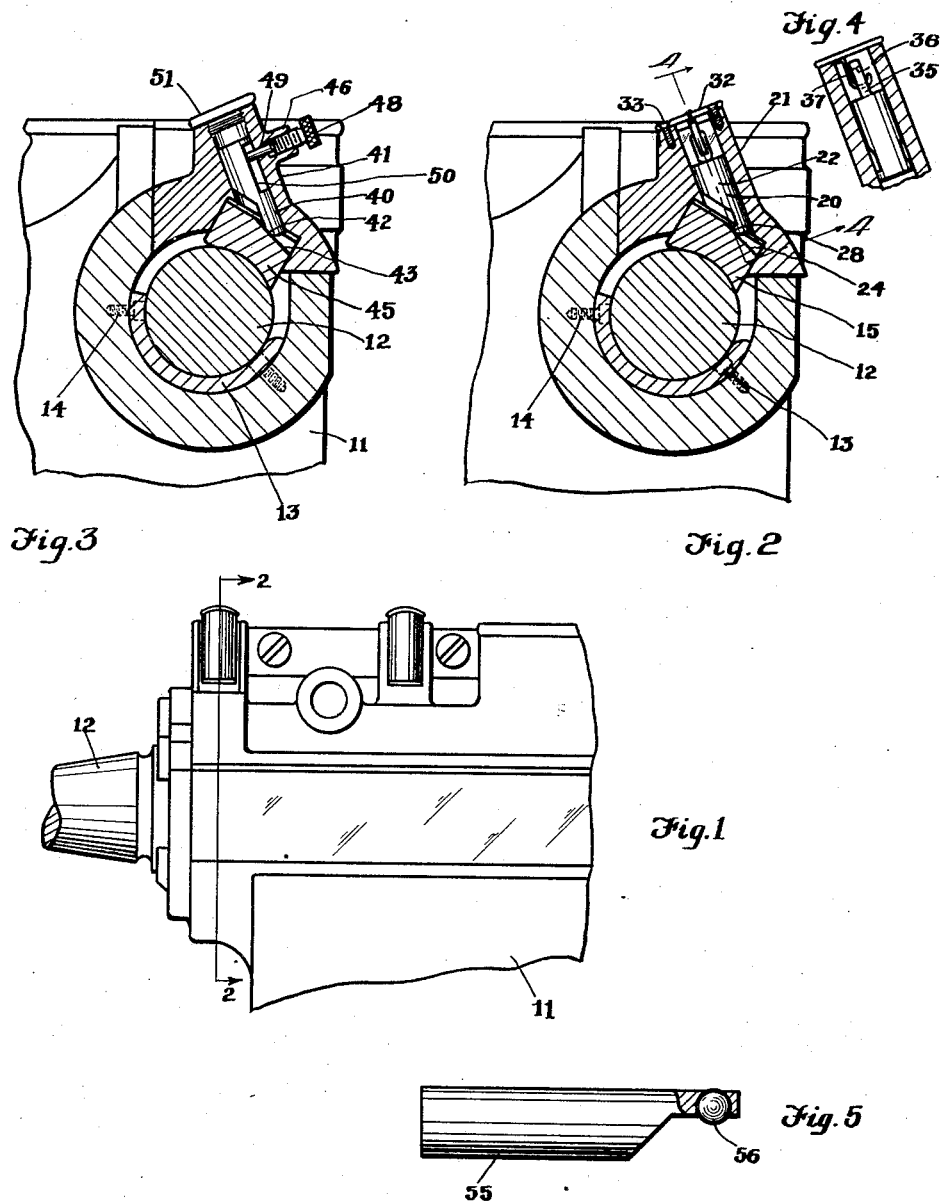
Witnesses
Chas. H. Richards
Harold W. Eaton
Inventor
Charles H. Norton
By
Attorney Patented June 2, 1931

1,807,700

UNITED STATES PATENT OFFICE

CHARLES H. NORTON, OF PLAINVILLE, CONNECTICUT, ASSIGNOR TO NORTON COMPANY, OF WORCESTER, MASSACHUSETTS, A CORPORATION OF MASSACHUSETTS

SELF ADJUSTING BEARING FOR SPINDLES

Application filed September 1, 1925, Serial No. 53,806. Renewed March 12, 1930.

My invention relates to a bearing and more particularly to an automatically adjustable spindle bearing construction for supporting a rapidly rotating grinding wheel spindle.

Heretofore, various types of bearings have been designed which have means to adjust the bearing surface as the surface of the spindle and bearing wears away. The common type of bearing used for spindles comprises a tapered member provided with radial slots and so arranged that by moving the bearing endwise the inner bearing surface is expanded or contracted depending upon the direction in which the member is moved.

In a grinding wheel spindle construction where a rapidly rotating spindle is used, the above mentioned type of bearing is not desirable for a fine precision machine, since the bearing members cannot be readily adjusted while the spindle is rotating to take up play due to wear or expansion and contraction and to prevent the spindle from vibrating and so causing chatter marks on the work. Heat is generated by the friction of the bearing parts so that the spindle, when running, is comparatively hot and consequently the bearing parts are expanded somewhat from their idle position. In a precision grinding machine, it is essential that the bearings be properly adjusted when the machine is warmed up to its running temperature so that there may be no opportunity for a vibrating movement of the spindle which detrimentally affects the surface of the work being ground. If the bearings are not properly adjusted, the grinding wheel, due to the driving and grinding thrusts, vibrates considerably and causes chatter marks on the work piece.

A more recent development in spindle bearings is illustrated in my prior Patent No. 1,443,925. In that construction I provide a lower half bearing fixed relative to the housing and an upper adjustable or floating bearing member to hold the spindle or shaft in adjusted position relative to the lower bearing member. In this construction, as well as in the earlier types of spindle bearings, adjustment is made by the operator turning adjusting screws or collars to take up the wear in the bearing surfaces. I have found, however, that it is not desirable to permit the average machine operator to make such adjustments, as he is not skilled in the art of properly adjusting the bearings and frequently tightens the adjusting screws or collars too much, thereby causing a sticking or burning out of the bearing surfaces. In my patented construction, knurled thumb screws and lock nuts are provided so that the operator may adjust the bearing without the aid of a wrench or the like with sufficient pressure to hold the spindle in proper relation to the fixed bearing member. It is found in practice, however, that many operators disregard the knurled adjusting screws as being essentially manually adjustable devices, and they apply wrenches or pliers to the knurled portion and tighten the floating bearing members with excessive force so that serious damage is caused to the spindle as well as the bearing surfaces.

It is the object of my invention to overcome these difficulties and to provide an improved bearing construction in which the adjustment for wear of the bearing surfaces is taken care of automatically so that the operator does not have to watch the spindle bearing and make adjustments from time to time as the bearing surface wears or to take care of looseness of the bearing parts due to expansion or contraction of the bearing.

It is a further object of my invention to provide a self-adjusting bearing device which is practically impossible for the operator to adjust manually or by the application of a wrench or other means and which is so constructed that excessive pressure may not be applied to improperly adjust or tighten the bearing surfaces.

It is another object of my invention, to employ a simplified construction in which the influence of gravity may be utilized to hold or lock the floating or adjustable bearing member in adjusted position relative to the grinding wheel spindle.

Further objects will be apparent in the following disclosure.

Referring to the drawings which illustrate embodiments of my invention, and in which like reference numerals indicate like parts:

Fig. 1 is a fragmentary front elevation of the spindle bearing construction;

Fig. 2 is a sectional view of the bearing showing the automatic adjusting device taken approximately on the line 2—2 of Fig. 1;

Fig. 3 is a similar sectional view showing a modified construction;

Fig. 4 is a fragmentary sectional view taken approximately on the line 4—4 of Fig. 2; and Fig. 5 is a side elevation partially broken away showing a modified form of wedge.

In accordance with my invention, I provide a bearing which is particularly adapted for supporting a grinding wheel spindle in a precision grinding machine and which comprises a self-adjusting member so constructed and arranged as to automatically take up any wear or play in the bearing. This is preferably accomplished by employing a locking pin or other suitable means cooperating with a floating or adjustable bearing member. To adjust the locking pin relative to the floating or adjustable bearing member, I may employ a device so arranged that the locking pin may be automatically moved toward the floating bearing member and held in proper adjustment relative to the spindle. In my preferred construction, I utilize the influence of gravity for this purpose and so arrange the parts that the locking pin may move downwardly automatically as the spindle or bearing surface wears away or the parts move under the influence of temperature changes, and the locking pin is prevented from moving backwards and so locks the floating bearing member in proper adjustment relative to the spindle and fixed bearing member.

As illustrated in the drawings, I have shown a fragment of a wheel slide 11 having a grinding wheel spindle 12 mounted for rotation in the fixed partial cylindrical bearing member 13 which is fixed to the wheel slide by screws 14. A floating or adjustable bearing member 15 is provided to hold the grinding wheel spindle 12 in proper adjusted position relative to the fixed bearing member 13. This construction in its general aspects is clearly illustrated and described in my prior Patent No. 1,443,925.

The fixed and floating bearing members may be positioned in any desired relation with respect to the grinding wheel spindle depending upon the thrust of the spindle or the nature of the mechanism in which the bearing is to be employed. In a precision grinding machine where the thrust of the grinding wheel spindle is downward, I preferably mount the fixed bearing 13 below the spindle and place the floating bearing member 15 above the spindle so that it may be held in contact with spindle by the influence of gravity.

In order that the floating bearing member may be held in its adjusted position relative to the spindle, I provide means for causing an automatic adjustment of the floating bearing member, which in my preferred construction, comprises a locking pin 20 slidably mounted in a guideway in the hollow housing 21 of the wheel slide 11. This locking pin may be cylindrical in cross section, and is of such a size and shape that it slides freely within the cylindrical guideway 22, so that the influence of gravity is sufficient to move it downwardly. The locking pin engages the top surface of the floating bearing 15 on one side and the upper surface of the guideway 22 on the other, and these two surfaces thus engaged are so arranged that the locking pin may move downwardly between them to maintain the bearing member in proper contact with the spindle. It will be observed that the locking pin contacting surface 24 of the bearing constitutes the bottom of a groove in the top of the bearing which is so shaped as to hold the locking pin in proper position and permit an efficient movement thereof.

To lock the floating bearing member in proper adjustment relative to the spindle or shaft, I make the angle between the locking pin and the surface of the bearing member such that the locking pin may not be moved outwardly by the thrust of the bearing parts. That is, the angle between the upper surface of the guideway 22 and the surface of the floating bearing member 15 engaged by the locking pin is such as to permit the locking pin to move only downwardly as the floating bearing member moves towards the spindle, and thereby lock the floating bearing member in its adjusted position and prevent it from raising away from the surface of the spindle. The lower end of the locking pin 20 is preferably cut away to form a curved end so shaped that its operative surface 28 engages the surface 24 on the floating bearing member 15 only on a line contact. While the relative arrangement of these parts may be varied, I have illustrated the center of the floating bearing as located at one side of a vertical radial plane in the spindle, and the locking pin movable along a line which slopes relative to a vertical line, this arrangement being particularly suited for a grinding machine wheel spindle.

To make it practically impossible for the operator to adjust the bearing, I may provide the housing 21 with a cover plate 32 which is secured in place by screws 33. This is spaced from the upper end of the locking pin and makes it difficult for one to get at the pin and force it downwardly, particularly as the pin is of such a size as to fit the bore in the casing fairly accurately, only enough play being allowed to permit the pin to move freely under the influence of gravity. In order that the locking pin 20 may be removed in case it is desired to take the wheel spindle assembly apart, I may provide the upper end of the pin with a projection 35 which has an elongated slot 36. A hook shaped member 37 is riveted or screwed to the under side of the cover plate 32 and has its lower end hook shaped to pass through the elongated slot 36. If it is desired to remove the locking pin 20 the screws 33 must be removed, and the plate 32 raised to draw the pin out by the hook shaped member 37. It will be understood that the slot is so shaped that free movement downwardly of the wedge is not prevented.

In certain types of bearings, it may be necessary to take the expansion and contraction of the bearing parts into further consideration, and with this in view, I have illustrated a modification, as shown in Fig. 3, which provides means for locking the pin relative to the housing in any position. As illustrated, I employ a locking pin 40 which is slidably mounted in the housing 41 in the wheel slide 11. The lower end of the pin 40 is provided with an angled surface 42 which is similar to that shown in Fig. 2. This surface 42 engages the beveled surface 43 on the floating bearing member 45. The angle of the supporting surface of the pin 40 and the upper surface of the floating bearing member 45 are the same as that illustrated and described in connection with Fig. 2. To lock the pin in adjusted position, I may utilize any suitable mechanism but in my preferred construction I have shown the housing 41 provided with a boss 46 projecting therefrom. This boss is threaded internally and has screw threaded therein the knurled adjusting screw 48. The inner end of the screw 48 contacts with the outer end of a locking pin 49 which is slidably mounted in a hole in the housing 41 which opens into the threaded chamber within the boss. The other end of the pin 49 slides in and engages the bottom of a keyway 50 in the locking pin 40. It will be readily seen from this construction that the wedge 40 may be locked in its adjusted position by tightening the screw 48 and forcing the pin 49 into engagement with the wedge. I provide a cover 51 which is screw threaded into the housing 41 thereby preventing the operator from readily making a manual adjustment by driving the locking pin downwardly and applying excessive pressure to the floating bearing member.

In the use of the bearing construction shown in the modification (Fig. 3), the machine is started and the spindle rotated to permit the bearing and spindle parts to warm up to their running temperature with the locking pin held in position relative to its housing 41 by the adjusting screw 48. When the machine parts have reached their running temperature the screw 48 is turned to release the locking pin from its clamped position and permit it to drop downwardly against the floating bearing member and lock the floating bearing member in proper adjustment relative to the wheel spindle. When the machine is stopped for any length of time, such as overnight, the screw 48 may be tightened to lock the pin 40 in place and prevent it from moving toward the spindle as the machine parts contract due to cooling off.

If the operator of a grinding machine, which has the type of bearing shown in Fig. 3, is one of that class who does not obey the printed instructions furnished him but prefers to adjust the various screws on the machine according to his own ideas, he can do no damage by setting up screw 48 when the machine is running or in leaving it thus set for a considerable time. It is sufficient that the spindle bearing be adjusted once in a few weeks. The operator cannot cause the spindle to bind by setting up any bearing screws, and if he leaves the machine alone it takes care of itself. The operator may permit the bearings to be properly adjusted, but he cannot cause them to be improperly positioned.

In the drawings, Figs. 2 and 3, I have shown a locking pin which is beveled and shaped at its lower end to form a wedging device. As a modification of this construction, I have illustrated in Fig. 5 a locking pin 55, the end of which is cut away and provided with an opening to secure or hold therein a ball or roller 56. This ball or roller is positioned so as to engage on one side the surface of the housing of the wheel slide and on the other the upper bearing surface of the floating bearing member, and the parts are so shaped and arranged that the ball or roller will lock into position between the relatively adjustable parts and lock the bearing member in position.

It will, of course, be understood that one may use more than one floating bearing member in this construction, and that various other modifications of my device may be made as will be readily apparent in the light of the above disclosure, hence the claims appended hereto are to be interpreted accordingly.

Having thus described my invention, what I claim as new and desire to secure by Letters Patent is:

1. A bearing for a grinding wheel spindle comprising a lower fixed bearing member arranged to serve as the sole bearing support for the spindle, a floating bearing shoe maintained in engagement with a small portion of the upper part of the spindle to steady the same, means to hold the shoe from lateral movement, a locking pin which is mounted in contact with the shoe and is biased towards movement inwardly so as to maintain contact with the shoe, a guideway for said locking pin having a thrust receiving wall arranged at such an angle relative to the surface of the bearing shoe engaging the locking pin that the latter will follow up any inward movement of the shoe and prevent outward movement thereof, and means for manually locking said pin in its operative position and thereby preventing inward movement of the locking pin under the influence of its bias.

2. A wheel spindle bearing for grinding machines comprising a support, a lower fixed bearing member mounted thereon to serve as the sole bearing support for the spindle, a small freely movable bearing shoe opposed to said fixed bearing member and engaging only a small portion of the upper part of said spindle which serves solely to steady the spindle in its support, means to hold the shoe from lateral movement, a locking pin movably engaging the surface of the bearing shoe, means including a guideway for the locking pin which keeps the pin in contact with the shoe, the upper surface of the bearing shoe engaged by said locking pin and the guideway being arranged at such an angle that the guideway will receive the thrust of the spindle and normally prevent backward movement of the locking pin but permit the latter to be freely movable to hold the bearing shoe in proper relation with the spindle, and means for holding the pin in its operative position and prevent movement towards the shoe while the spindle is not rotating.

Signed at Worcester, Massachusetts, this 28th day of August, 1925.

CHARLES H. NORTON.